United States Patent
Sharifi et al.

(10) Patent No.: US 11,620,990 B2
(45) Date of Patent: Apr. 4, 2023

(54) ADAPTING AUTOMATED SPEECH RECOGNITION PARAMETERS BASED ON HOTWORD PROPERTIES

(71) Applicant: Google LLC, Mountain View, CA (US)

(72) Inventors: Matthew Sharifi, Kilchberg (CH); Aleksandar Kracun, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/120,033

(22) Filed: Dec. 11, 2020

(65) Prior Publication Data
US 2022/0189466 A1    Jun. 16, 2022

(51) Int. Cl.
| | |
|---|---|
| *G10L 15/16* | (2006.01) |
| *G10L 25/90* | (2013.01) |
| *G10L 15/22* | (2006.01) |
| *G10L 15/28* | (2013.01) |
| *G10L 15/08* | (2006.01) |
| *G10L 25/78* | (2013.01) |

(52) U.S. Cl.
CPC ............. *G10L 15/16* (2013.01); *G10L 15/22* (2013.01); *G10L 15/28* (2013.01); *G10L 25/90* (2013.01); *G10L 2015/088* (2013.01); *G10L 2025/783* (2013.01)

(58) Field of Classification Search
CPC .......... G10L 15/06; G10L 15/22; G10L 15/28
See application file for complete search history.

(56) References Cited

U.S. PATENT DOCUMENTS

| | | | | |
|---|---|---|---|---|
| 5,897,616 | A * | 4/1999 | Kanevsky | G10L 17/22 704/270.1 |
| 6,157,913 | A * | 12/2000 | Bernstein | G10L 17/26 704/275 |
| 9,070,366 | B1 * | 6/2015 | Mathias | G10L 13/08 |
| 9,697,822 | B1 * | 7/2017 | Naik | G10L 15/22 |
| 9,799,329 | B1 * | 10/2017 | Pogue | G10L 25/51 |
| 9,830,924 | B1 * | 11/2017 | Degges, Jr. | G10L 15/22 |
| 10,388,272 | B1 * | 8/2019 | Thomson | G10L 15/22 |
| 10,825,451 | B1 * | 11/2020 | Yavagal | G10L 15/063 |

(Continued)

OTHER PUBLICATIONS

International Search Report and Written Opinion related to Application No. PCT/US2021/060234, dated May 3, 2022.

*Primary Examiner* — Shaun Roberts
(74) *Attorney, Agent, or Firm* — Honigman LLP; Brett A. Krueger; Grant Griffith

(57) ABSTRACT

A method for optimizing speech recognition includes receiving a first acoustic segment characterizing a hotword detected by a hotword detector in streaming audio captured by a user device, extracting one or more hotword attributes from the first acoustic segment, and adjusting, based on the one or more hotword attributes extracted from the first acoustic segment, one or more speech recognition parameters of an automated speech recognition (ASR) model. After adjusting the speech recognition parameters of the ASR model, the method also includes processing, using the ASR model, a second acoustic segment to generate a speech recognition result. The second acoustic segment characterizes a spoken query/command that follows the first acoustic segment in the streaming audio captured by the user device.

18 Claims, 4 Drawing Sheets

(56) References Cited

U.S. PATENT DOCUMENTS

| | | | |
|---|---|---|---|
| 2005/0137868 A1* | 6/2005 | Epstein | G10L 15/183 704/252 |
| 2006/0074651 A1* | 4/2006 | Arun | G10L 15/22 704/233 |
| 2008/0065387 A1* | 3/2008 | Cross, Jr. | G10L 17/00 704/270 |
| 2009/0086934 A1* | 4/2009 | Thomas | G10L 15/07 379/88.01 |
| 2012/0150541 A1* | 6/2012 | Talwar | G10L 15/065 704/249 |
| 2014/0136202 A1* | 5/2014 | Sims, III | G10L 15/065 704/244 |
| 2015/0206544 A1 | 7/2015 | Carter | |
| 2015/0310865 A1* | 10/2015 | Fay | G10L 15/01 704/254 |
| 2015/0379985 A1* | 12/2015 | Wang | G10L 15/07 704/250 |
| 2016/0077794 A1* | 3/2016 | Kim | G06F 3/167 704/275 |
| 2016/0379632 A1* | 12/2016 | Hoffmeister | G10L 25/87 704/253 |
| 2017/0256270 A1* | 9/2017 | Singaraju | G10L 25/21 |
| 2018/0090127 A1* | 3/2018 | Hofer | G10L 15/07 |
| 2018/0190290 A1 | 7/2018 | Campbell et al. | |
| 2018/0308491 A1 | 10/2018 | Oktem et al. | |
| 2019/0088260 A1 | 3/2019 | Vachhani et al. | |
| 2019/0362719 A1* | 11/2019 | Gruenstein | G10L 15/063 |
| 2020/0043468 A1* | 2/2020 | Willett | G06N 5/003 |
| 2020/0090657 A1 | 3/2020 | Czarnowski | |

\* cited by examiner

ADAPTING AUTOMATED SPEECH RECOGNITION PARAMETERS BASED ON HOTWORD PROPERTIES

TECHNICAL FIELD

This disclosure relates to adapting automated speech recognition parameters based on hotword properties.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Once awake, the devices can proceed to perform more expensive processing such as full on-device automated speech recognition (ASR) or server-based ASR.

SUMMARY

One aspect of the disclosure provides a method for optimizing speech recognition. The method includes receiving, at data processing hardware, a first acoustic segment characterizing a hotword detected by a hotword detector in streaming audio captured by a user device; extracting, by the data processing hardware, one or more hotword attributes from the first acoustic segment; and adjusting, by the data processing hardware, based on the one or more hotword attributes extracted from the first acoustic segment, one or more speech recognition parameters of an automated speech recognition (ASR) model. After adjusting the speech recognition parameters of the ASR model, the method also includes processing, by the data processing hardware, using the ASR model, a second acoustic segment to generate a speech recognition result. The second acoustic segment characterizes a spoken query/command that follows the first acoustic segment in the streaming audio captured by the user device.

Implementations of the disclosure may include one or more of the following optional features. In some implementations, the one or more hotword attributes extracted from the first acoustic segment include at least one of a pause duration measure, a rate of speech measure, a pitch measure, an ASR prediction measure, or a loudness/tone measure. In some examples, the method also includes, when receiving the first acoustic segment, receiving, at the data processing hardware, a confidence score indicating a confidence on the likelihood that the streaming audio captured by the user device contains a hotword the hotword detector is trained to detect. In these examples, extracting the one or more hotword attributes from the first acoustic segment includes extracting an ASR prediction measure indicating a likelihood that the ASR model will accurately recognize the query/command portion in the second acoustic segment. Here, adjusting the one or more speech recognition parameters of the ASR model may include: when the confidence score is greater than a confidence score threshold, decreasing a number of speech recognition hypotheses output by the ASR model and/or decreasing a beam search width of the ASR model; or when the confidence score is less than the confidence score threshold, increasing the number of speech recognition hypotheses output by the ASR model and/or increasing the beam search width of the ASR model. Additionally or alternatively, adjusting the one or more speech recognition parameters of the ASR model may include: when the confidence score is greater than a confidence score threshold, adjusting the one or more speech recognition parameters to bias recognition hypotheses toward recognizing the hotword in the first acoustic segment; or when the confidence score is less than the confidence score threshold, adjusting the one or more speech recognition parameters to not bias recognition hypotheses toward recognizing the hotword in the first acoustic segment.

In some implementations, extracting one or more hotword attributes from the first acoustic segment includes extracting a pitch measure specifying a range of frequencies associated with the first acoustic segment, and adjusting the one or more speech recognition parameters includes adjusting the one or more speech recognition parameters to apply frequency-based filtering on the second acoustic segment by focusing on the specified range of frequencies when processing the second acoustic segment to generate the speech recognition result. When one of the one or more hotword attributes extracted from the first acoustic segment includes a tone and loudness score specifying a tone and loudness of a voice when speaking the hotword, the method may also include influencing, by the data processing hardware, a natural language understanding (NLU) module when performing query interpretation on the generated speech recognition result.

In some implementations, when one of the one or more hotword attributes extracted from the first acoustic segment includes a pause duration measure indicating an extent that a speaker paused while speaking the hotword and/or between speaking the hotword and the query/command, the method also includes instructing, by the data processing hardware, an endpointer to one of increase or decrease a duration of an endpointing timeout duration from a default value based on the pause duration measure. Additionally or alternatively, when one of the one or more hotword attributes extracted from the first acoustic segment includes a rate of speech measure indicating a rate at which a speaker spoke the hotword in the streaming audio, the method may also include instructing, by the data processing hardware, an endpointer to one of increase or decrease a duration of an endpointing time out duration from a default value based on the rate of speech measure. In some examples, the one or more hotword attributes are extracted from the first acoustic segment using at least one of a neural network-based model or a heuristic-based model.

Another aspect of the disclosure provides a system for optimizing speech recognition. The system includes data processing hardware and memory hardware in communication with the data processing hardware and storing instructions that when executed on the data processing hardware causes the data processing hardware to perform operations that include receiving a first acoustic segment characterizing a hotword detected by a hotword detector in streaming audio captured by a user device, extracting one or more hotword attributes from the first acoustic segment, and adjusting, based on the one or more hotword attributes extracted from the first acoustic segment, one or more speech recognition parameters of an automated speech recognition (ASR) model. After adjusting the speech recognition parameters of the ASR model, the operations also include processing, using ASR model, a second acoustic segment to generate a speech recognition result. The second acoustic segment characterizes a spoken query/command that follows the first acoustic segment in the streaming audio captured by the user device.

This aspect may include one or more of the following optional features. In some implementations, the one or more hotword attributes extracted from the first acoustic segment include at least one of a pause duration measure, a rate of speech measure, a pitch measure, an ASR prediction measure, or a loudness/tone measure. In some examples, the operations also include, when receiving the first acoustic segment, receiving a confidence score indicating a confidence on the likelihood that the streaming audio captured by the user device contains a hotword the hotword detector is trained to detect. In these examples, extracting the one or more hotword attributes from the first acoustic segment includes extracting an ASR prediction measure indicating a likelihood that the ASR model will accurately recognize the query/command portion in the second acoustic segment. Here, adjusting the one or more speech recognition parameters of the ASR model may include: when the confidence score is greater than a confidence score threshold, decreasing a number a speech recognition hypotheses output by the ASR model and/or decreasing a beam search width of the ASR model; or when the confidence score is less than the confidence score threshold, increasing the number of speech recognition hypotheses output by the ASR model and/or increasing the beam search width of the ASR model. Additionally or alternatively, adjusting the one or more speech recognition parameters of the ASR model may include: when the confidence score is greater than a confidence score threshold, adjusting the one or more speech recognition parameters to bias recognition hypotheses toward recognizing the hotword in the first acoustic segment; or when the confidence score is less than the confidence score threshold, adjusting the one or more speech recognition parameters to not bias recognition hypotheses toward recognizing the hotword in the first acoustic segment.

In some implementations, extracting one or more hotword attributes from the first acoustic segment includes extracting a pitch measure specifying a range of frequencies associated with the first acoustic segment, and adjusting the one or more speech recognition parameters includes adjusting the one or more speech recognition parameters to apply frequency-based filtering on the second acoustic segment by focusing on the specified range of frequencies when processing the second acoustic segment to generate the speech recognition result. When one of the one or more hotword attributes extracted from the first acoustic segment includes a tone and loudness score specifying a tone and loudness of a voice when speaking the hotword, the operations may also include influencing a natural language understanding (NLU) module when performing query interpretation on the generated speech recognition result.

In some implementations, when one of the one or more hotword attributes extracted from the first acoustic segment includes a pause duration measure indicating an extent that a speaker paused while speaking the hotword and/or between speaking the hotword and the query/command, the operations also include instructing an endpointer to one of increase or decrease a duration of an endpointing timeout duration from a default value based on the pause duration measure. Additionally or alternatively, when one of the one or more hotword attributes extracted from the first acoustic segment includes a rate of speech measure indicating a rate at which a speaker spoke the hotword in the streaming audio, the operations may also include instructing an endpointer to one of increase or decrease a duration of an endpointing timeout duration from a default value based on the rate of speech measure. In some examples, the one or more hotword attributes are extracted from the first acoustic segment using at least one of a neural network-based model or a heuristic-based model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Performing accurate speech recognition is challenging due to the fact that an automated speech recognition (ASR) engine needs to recognize and understand short, noisy, open-ended utterances spoken by all users in a single language or locale. To improve accuracy, ASR engines often rely on techniques such as incorporating context into the speech recognition process as humans do when communicating with one another. By incorporating context, speech recognition results can be biased to improve accuracy. Often, a user's location and user preferences are used as context for improving speech recognition.

As a hotword is usually spoken to invoke an assistant-enabled device for initiating a subsequent spoken query, there is a strong likelihood that a portion of audio data captured by the assistant-enabled device that characterizes the hotword correlates to a remaining portion of the audio data corresponding to the spoken query. Thus, the audio data characterizing the hotword may include important information for use in assisting a speech recognizer to accurately and/or more efficiently recognize the query spoken by the user. Implementations herein are directed toward deriving contextual signals from audio data that characterizes a detected hotword and using the contextual signals to optimize speech recognition on audio that follows the hotword. As will be described in greater detail below, contextual signals derived from audio data characterizing a detected hotword may include a rate of speech or duration of pauses during and/or after speaking the hotword, frequency/pitch of the audio data characterizing the hotword, a confidence score and/or noise levels output by a hotword detector that detected the presence of the hotword in streaming audio, and other speaking attributes such as tone and loudness.

Figure 1:
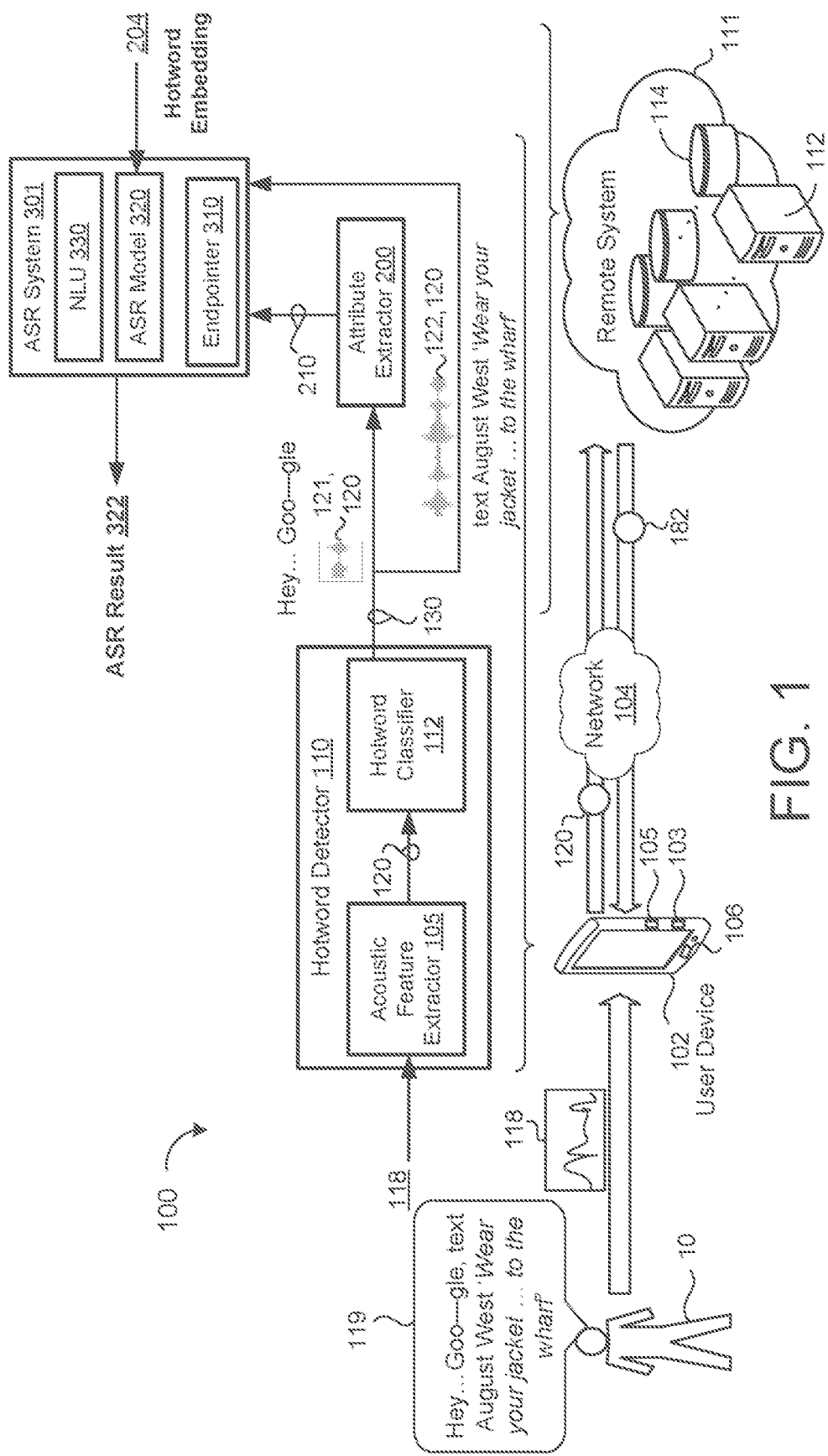
FIG. 1 is an example system for optimizing speech recognition based on hotword attributes extracted from spoken audio.

Referring to FIG. 1, in some implementations, an example system 100 includes a user device 102 associated with one or more users 10 and in communication with a remote system 111 via a network 104. The user device 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 107. The user device 102 includes or is in communication with one or more microphones 106 for capturing utterances from the respective user 10. The remote system 111 may be a single computer, multiple computers, or a distributed system (e.g., a cloud environment) having scalable/elastic computing resources 113 (e.g., data processing hardware) and/or storage resources 115 (e.g., memory hardware).

The user device 102 includes a hotword detector 110 (also referred to as a hotword detection model) configured to detect the presence of a hotword in streaming audio 118 without performing semantic analysis or speech recognition processing on the streaming audio 118. The user device 102 also includes an acoustic feature extractor 105 which may be implemented as part of the hotword detector 110 or a separate component from the hotword detector 110. The acoustic feature extractor is configured to extract acoustic features from utterances 119. For instance, the acoustic feature extractor 105 may receive streaming audio 118 captured by the one or more microphones 106 of the user device 102 that corresponds to an utterance 119 spoken by the user 10 and extract acoustic features 120. The acoustic features 120 may include Mel-frequency cepstrum coefficients (MFCCs) or filter bank energies computed over windows of an audio signal.

The hotword detector 110 may receive the acoustic features 120 extracted by the acoustic feature extractor 105, and based on the extracted features 120, a hotword classifier 112 is configured to classify whether the utterance 119 includes a particular hotword spoken by the user 10. The user device may include multiple hotword classifiers 112 each trained to detect a different hotword associated with a particular term/phrase. These hotwords may be predefined hotword and/or custom hotwords assigned by the user 10. In some implementations, the hotword classifier 112 includes a trained neural network (e.g., a memorialized neural network) received from the remote system 111 via the network 104

In some examples, the hotword detector 110 includes a cascade hotword detection architecture including an initial course stage hotword classifier and a subsequent fine stage hotword classifier. Here, the course stage hotword classifier is configured to initially detect the presence of the hotword in the acoustic features 120 before invoking the fine stage hotword detector to receive the acoustic features 120 and confirm whether or not the hotword is detected in the streaming audio 118. The course stage hotword classifier may run on a first processor, such as a digital signal processor (DSP), and the fine stage hotword classifier may run on a second processor, such as an application processor (AP) or CPU)), that consumes more power while operating than the first processor. The course stage hotword classifier residing on the first processor may include a smaller model size than a model associated with the fine stage hotword classifier, and is computationally efficient for coarsely screening input streaming audio 118 for hotword detection. Accordingly, the first processor may be "always-on" so that the coarse stage hotword classifier is always running to coarsely screen for hotword candidates in streaming audio 118, while all other components of the user device 102, including the main AP (e.g., second processor), are in a sleep state/mode to conserve battery life. On the other hand, the fine stage hotword classifier residing on the main AP, includes a larger model size and provides more computational output than the coarse stage hotword classifier for providing a more accurate detection of the hotword that was initially detected by the coarse hotword detector. Thus, the fine stage hotword classifier may be more stringent in determining whether or not the hotword is present in the audio 118. Thus, in implementations when the hotword detector 110 includes the cascade hotword detection architecture, only once the candidate hotword is detected, does the DSP trigger the main AP to transition from the sleep mode and into a hotword detection mode for running the fine stage hotword classifier.

In the example shown, the hotword classifier 112 is trained to detect the presence of the hotword "Hey Google" in acoustic features 120 that causes the user device 102 to wake-up from a sleep state or hibernation state and trigger speech recognition on the hotword and/or one or more other terms that follow the hotword, e.g., a voice query/command that follows the hotword in the streaming audio 118. Hotwords may be useful for "always on" systems that may potentially pick up sounds that are not directed toward the speech-enabled user device 102. For example, the use of hotwords may help the device 102 discern when a given utterance 119 is directed at the device 102, as opposed to an utterance that is directed to another individual present in the environment or a background utterance. In doing so, the device 102 may avoid triggering computationally expensive processing, e.g., speech recognition and semantic interpretation, on sounds or utterances that do not include a hotword.

The hotword classifier 112 may output a confidence score 130 that is binary, e.g., "Yes" or "No" that indicates if the utterance is classified as likely including the hotword (e.g., "Hey Google") that the classifier 112 is trained to detect in the acoustic features 120 extracted from the streaming audio 118. Additionally or alternatively, the hotword classifier 112 may output a confidence score 130 that is non-binary, e.g., a confidence score of 0%, 10%, 30% 75%, or 95%, that may indicate a confidence on the likelihood that the utterance includes the respective hotword that the classifier 112 is trained to detect in the acoustic features 120 extracted from the streaming audio 118. For example, in response to receiving extracted acoustic features for the utterance "Ok Google", the hotword classifier 112 may output the confidence score 130 "Yes, 85%". The confidence score may additionally or alternatively be represented by a range of numbers between "0" and "1", e.g., "0.25" corresponding to 25%.

In some examples, the hotword classifier 112 is configured to detect a hotword event indicating that the presence of the hotword is present the streaming audio 118 when the confidence score 130 output from the hotword classifier 112 satisfies a hotword detection threshold. For instance, the hotword detection threshold may be 80% or 0.8 such that the hotword event is detected when the confidence score 130 is greater than or equal to 80% or 0.8. Upon detecting the hotword event, the hotword detector 110 provides a first acoustic segment 121 chomped from the acoustic features 120 to an attribute extractor 200 that is configured to extract one or more hotword attributes 210 that may be used as contextual signals for optimizing speech recognition of the user's 10 utterance 119 by an automated speech recognition (ASR) system 301. The first acoustic segment 121 includes the relevant acoustic features associated with the presence of the hotword detected by the hotword detector 110. The hotword detector 110 also provides a second acoustic segment 122 chomped from the acoustic features 120 to the ASR system 301, whereby the second acoustic segment 122 includes portions of the utterance 119 captured by the user device 102 in the streaming audio 118 that follow the first acoustic segment 121. Typically, the first acoustic segment 121 is generally of a fixed duration sufficient for containing audio features associated with the designated hotword. The second acoustic segment 122, however, may have a variable duration containing audio captured by the user device 102 while the microphone 106 is open and the user is still speaking. The second acoustic segment 122 may capture a query-type utterance that requires further processing (e.g., automated speech recognition and/or semantic interpretation) by the ASR system 301 on one or more terms to identify a query or command in the audio data.

Figure 2:
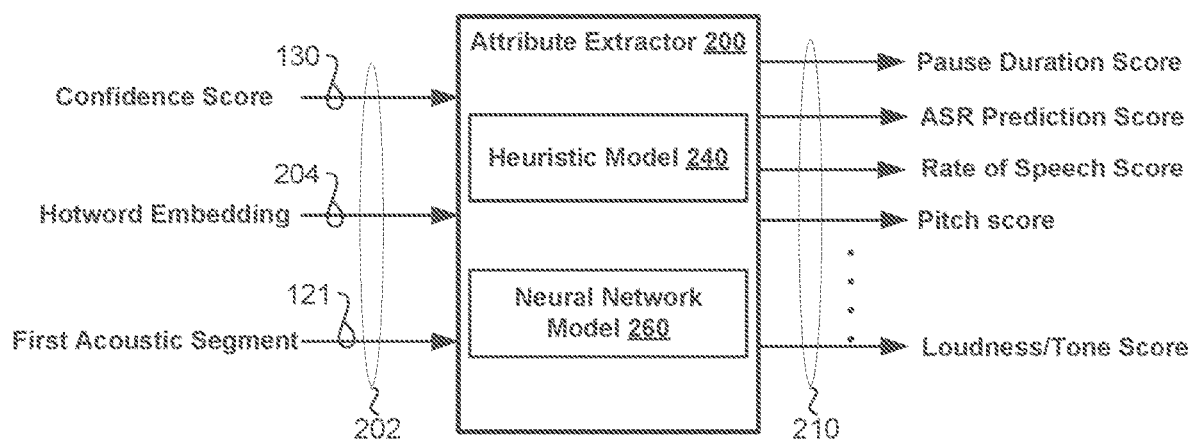
FIG. 2 is an example attribute extractor configured to extract one or more hotword attributes from acoustic features.

FIG. 2 shows a schematic view of an example attribute extractor 200 of FIG. 1 extracting one or more hotword attributes 210 from one or more hotword input features 202. The hotword input features 202 may include the first acoustic segment 121 chomped from the acoustic features 120 by the hotword classifier 112, the confidence score 130 indicating the likelihood that the utterance 119 includes the hotword, and a hotword embedding 204 encoding the first acoustic segment 121 that characterizes the portion of the utterance 119 that includes the hotword. The hotword classifier 112 may generate the hotword embedding 204 when performing hotword detection on the incoming acoustic features 120 to determine whether the hotword is present. The hotword input features 202 may additionally include a portion of the streaming audio 118 that includes the hotword.

In some examples, the attribute extractor 200 includes one or more heuristic models 240 and/or one or more neural network models 260. For instance, the attribute extractor 200 may implement a heuristic model 240 to detect a duration of pauses during and/or after speaking the hotword. The heuristic model 240 may extract a pause duration measure as one of the hotword attributes indicating an extent that the user 10 paused while speaking the hotword and/or after speaking the hotword before speaking the query/command portion of the utterance. As discussed in greater detail below, an endpointer 310 of the ASR system 301 may decrease/increase an endpointing timeout from a default value based on the pause duration measure. That is, higher pause duration measures indicating that the user 10 paused longer than a typical user, and/or longer than the user 10 typically pauses, when speaking the hotword may result in the endpointer 310 increasing/extending the endpointing timeout.

Based on the confidence score 130 output by the hotword classifier 112, the same or different heuristic model 240 (or optionally a neural network model 260) of the attribute extractor 200 may extract an ASR prediction measure (e.g., ASR prediction score) as one of the hotword attributes 210 indicating a likelihood that an ASR model 320 of the ASR system will accurately recognize the query/command portion of the utterance 119. For instance, higher hotword confidence scores 130 provide a correlation that since the hotword classifier 112 was able to confidently detect the presence of the hotword in the streaming audio 118, the ASR model 320 will more likely be able to accurately recognize the query/command portion of the utterance 119 when performing speech recognition on the second acoustic segment 122.

In some implementations, the attribute extractor 200 implements a neural network model 260 configured to extract, from one or more of the hotword input features 202, a rate of speech measure (e.g., rate of speech score) as one of the hotword attributes 210 indicating the rate (e.g., how fast/slow) at which the user 10 spoke the hotword portion of the utterance 119. Here, the neural network model 260 may include a deep neural network trained through machine learning in a supervised and/or unsupervised manner. As with the pause duration measure, the rate of speech measure may be utilized by the endpointer 310 of the ASR system 301 to decrease/increase the endpointing timeout from the default value. That is, lower rate of speech measures indicating that the user 10 spoke the hotword portion of the utterance 119 slower than a typical user, and/or slower than the user 10 typically speaks, when speaking the hotword may result in the endpointer 310 increasing/extending the endpointing timeout. Similarly, higher rate of speech measures may result in the endpointer decreasing/reducing the endpointing timeout.

The same or different neural network model 260 may be configured to extract a pitch measure (e.g., high/low pitch) from one or more of the hotword input features 202. The pitch measure may be referred to as a pitch score. As described in greater detail below, the pitch measure may be fed to the ASR system 301 to provide a parameter that instructs the ASR model 320 to focus on a specific frequency/pitch range of input features (e.g., in the second acoustic segment 122) when performing speech recognition on the query/command portion of the utterance 119. In some examples, the neural network model extracts/estimates the pitch measure using techniques described in *SPICE: Self-supervised Pitch Estimation,* available at https://arxiv.org/pdf/1910.11664.pdf, and incorporated herein by reference.

In some examples, the same or different neural network model 260 is trained to extract, from the one or more hotword input features 202, a tone and loudness score as one of the hotword attributes 210 for use in optimizing the ASR model 320 for recognizing the query/command portion of the utterance 119. Tone and loudness of the user's voice could be used to influence a natural language understanding (NLU) module 330 of the ASR system 301 when interpreting the query/command portion of the utterance. For instance, tone and loudness score extracted from the hotword that indicates a tired voice could influence the NLU module 330 to request relaxing music from a music service when the query/command is "Play me some music", where as a tone and loudness score indicating an enthusiastic voice could instead influence the NLU module 330 to request party music from the music service for the same query command "Play me some music".

Referring back to FIG. 1, the user device 102 captures an utterance 119 spoken by the user 10 that is associated with the user 10 speaking with a slow rate of speech and including one or more long pauses in between terms. That is, the rate of speech may be slower than a typical rate of speech spoken by a typical user and/or may be slower than a rate of speech typically spoken by the user 10. Similarly, the pauses in between one or more of the terms may be associated with a pause duration that is longer than a typical pause duration used by a typical user and/or may be of a longer duration than the pause duration typically used by the user 10. The utterance 119 captured in the streaming audio 118 by the user device 102 includes "Hey . . . Goo—gle, text August West 'Wear your jacket . . . to the wharf.'" Here, the user 10 speaks the hotword Hey Google as "Hey . . . Goo—gle" with a long pause duration between the first term "Hey" and the second term "Google", and additionally, the user pronounces the second term with a slow rate of speech as evidenced by the user hesitating between the syllables "Goo" and "gle". The query/command portion of the utterance 119 includes the command "text August West" using the message contents "Wear your jacket . . . to the wharf". Here, the user 10 also speaks with a long pause duration between the terms "jacket" and "to" that segments the message contents into two segments, e.g., "Wear your jacket" and "to the wharf". In some examples, the endpointer 310 executing on the user device 102 (or the remote system 111) is configured to endpoint utterances upon detecting a period of non-speech for at least a default duration. Here, the long pause duration between the terms "jacket" and "to" in the message contents of the utterance may be longer than a default value of the endpointing timeout duration at the endpointer, and as a result, would cause the endpointer 310 to prematurely endpoint the utterance 119 after the term "jacket" and cut out the rest of the message contents "to the wharf". For instance, using the default value of the endpointing timeout, the endpointer 310 may instruct the user device 102 to close the microphone 106 so that no speech is captured after the term jacket. As a result, the ASR model 320 would only generate a transcription for "text August West 'Wear your jacket'" and pass an instruction to a texting application to transmit a text message with the message contents Wear your jacket to a user device associated with August West. In this scenario, the user 10 could be August's dad and August may be confused about when and where he should wear his jacket because he is meeting his dad for lunch today, and going to the wharf later in the evening with his brother. To prevent premature endpointing, the endpointer 310 may extend the duration of the endpointing timeout from the default value based on the hotword attributes 210 extracted from the hotword by the attribute extractor 200 that indicates that the user 10 spoke the hotword with slow rate of speech and with long pause durations between terms and syllables. By extending the duration of the endpoint timeout from the default value, the endpointer 310 will not instruct the microphone 106 to close prematurely so that the entire query/command portion of the utterance 119 that contains all of the message contents "Wear your jacket . . . to the wharf" will be captured. Thus, the recipient (e.g., August West) will receive the text message containing the entire contents of the message that the user 10 intended to convey.

With continued reference to FIG. 1, the hotword attributes 210 extracted by the attribute extractor 200 from the first acoustic segment 121 of the acoustic features 120 (and/or a hotword embedding 204 derived from the first acoustic segment 121) may indicate the pitch measure that instructs the ASR model 320 to focus on a specific frequency/pitch range of input features (e.g., in the second acoustic segment 122) when performing speech recognition on the query/command portion of the utterance 119. That is, the ASR model 320 may effectively filter out noise with frequencies outside a specified frequency range indicated by the pitch measure so that the ASR model 320 focuses only on sounds within the specified frequency range of the second acoustic segment 122 that correspond to the user's speech. The pitch measure, when received by the ASR system 301, may cause the ASR model 320 to use an attention mechanism to apply the frequency-based filtering, or simply apply feature cropping/weighting to focus on frequencies within the specified frequency range. Additionally or alternatively, the ASR system 301 preprocess the second acoustic segment 122 input the ASR model 320 to better emphasize the specified frequency range indicated by the pitch measure.

In a non-limiting example, the attribute extractor 200 may extract a pitch measure indicating detection of a low pitch voice speaking the hotword, whereby the ASR model 320 applies frequency-based filtering by focusing on only lower-frequency parts when performing speech recognition on the subsequent second acoustic segment 122 that conveys the query/command portion of the utterance 119. In this example, if the user 10 has small children conversing with one another in the background, the frequency-based filtering would not focus on higher frequency portions that would be associated with the high pitch speaking voices children. As opposed to existing voice filtering techniques that require obtaining a speaker embedding upfront that conveys voice characteristics of the speaker, the pitch measure extracted from the hotword portion of the utterance 119 can be used to identify the specified range of frequencies for applying frequency-based filtering. Thus, speaker enrollment is not necessary and advantageously permits ASR parameters to be adjusted for guest speakers naturally as well as for variations in a user's voice (e.g., a user speaking softly).

Additionally or alternatively, the hotword score 130 output from the hotword classifier 112 may be used to optimize the ASR model 320 for performing speech recognition on the second acoustic segment 122 conveying the query/command portion of the utterance 119. In the example of FIG. 1, the confidence score 130 satisfies the hotword detection threshold since the hotword classifier 112 detected the hotword event in the first acoustic segment 121 of the acoustic features 120. However, higher confidence scores 130 indicate that the hotword classifier 112 was more confident in detecting the presence of the hotword than lower confidence scores 130. A confidence score 130 satisfying the hotword detection threshold may be influenced by background noise captured in the first acoustic segment 121 that causes the hotword classifier 112 to be less confident in detecting the hotword event than if none or less background noise were captured. As a result, the ASR system 301 may use the hotword confidence score 130 to adjust parameters for the ASR model 320 when performing speech recognition on the second acoustic segment 122.

For example, in the scenario of a low hotword score 130 output from the hotword classifier 112 (e.g., the hotword score 130 satisfies the hotword detection threshold but does not satisfy a higher confidence threshold), the ASR model 320 when also used for hotword recognition (e.g., server-side hotword detection) to confirm the hotword event, may adjust parameters so that the ASR model 320 does not bias recognition results toward recognizing the hotword. In doing so, the ASR model 320 can direct the recognition process to first ensure that the hotword is in fact recognized since the low hotword score 130 suggests the possibility that the hotword classifier 112 running on the user device 102 falsely detected the hotword event. Moreover, the low hotword score 130 may cause the ASR model 320 to adjust other parameters such as considering a greater number of speech recognition hypotheses and/or increasing beam search width to allow the ASR model 320 to be more robust to noisier inputs.

On other hand, a high hotword score 130 (e.g., the hotword score 130 also satisfies the higher confidence threshold) received by the ASR model 320 may cause the ASR model 320 to adjust parameters such as considering a fewer number of speech recognition hypotheses and/or decreasing beam search width since there is a strong likelihood that the second acoustic segment 122 will be easier to recognize. Notably, this may optimize the speech recognition process by allowing the ASR model 320 to consume less processing resources and/or attain improved latency. These optimizations are particularly beneficial when the ASR model 320 runs entirely on the user device 102 where processing/memory limits are more constrained compared to a server. In lieu of comparing the hotword score 130 to a threshold for determining how to adjust ASR parameters, a linear mapping between different levels of hotword scores and corresponding ASR parameters may be accessed to determine how to adjust ASR parameters of the model 320.

In some examples, the ASR system 301 selects among multiple ASR models 320 for recognizing the utterance based on the magnitude of the hotword score 130. For instance, the ASR system 301 may select a less powerful ASR model 320 for recognizing the utterance 119 based on a high hotword score or select a more powerful ASR model 320 based on a low hotword score 130. In one example, the user device 102 executes the less powerful ASR model 320 perform speech recognition on-device based on the high hotword score. In another example, the remote system 111 executes the more powerful ASR model 320 to perform server-side speech recognition based on the low hotword score 130.

In some implementations, the one or more hotword attributes 210 include the tone and loudness score that indicates the tone and loudness of the user's 10 voice when speaking the hotword portion (e.g., "Hey . . . Goo—gle") of utterance 119. In some examples, the tone and loudness score may indicate that the user 10 is speaking quietly and with a tone that may provide some uncertainty as to whether the user 10 is really directing the utterance 119 toward the user device 102. In these examples, the ASR system 301 may first prompt the user 10 to verify that the user 10 was in fact directing the utterance 119 to the user device 102 before performing speech recognition. For instance, the ASR system 301 may instruct a dialogue system to generate a synthesized speech for output from the user device 102 that asks the user 10 "Did you really mean to talk to me?" A low confidence score 130 may further encourage the ASR system 301 to prompt the user 10 when the tone and loudness score indicates the user is speaking quietly and with the tone indicating that the user 10 may not be speaking to the device 102.

As set forth in the remarks above with reference to FIG. 2, the tone and loudness score may be further used to influence the NLU module 330 of the ASR system 301 when interpreting the query/command portion of the utterance. That is, the NLU module 330 may receive an ASR result 322 that transcribes the query/command portion of the utterance 119 and use the tone and loudness score when performing query interpretation on the ASR result 322. For instance, a tone and loudness score extracted from the hotword that indicates a tired voice could influence the NLU module 330 to request relaxing music from a music service when the ASR result 322 for the query/command is "Play me some music". Conversely, a tone and loudness score indicating an enthusiastic voice could instead influence the module 330 to request party music from the music service when interpreting the same ASR result 322 for the query/command "Play me some music". The tone could also be used for biasing in the query. For instance, the utterance "Play me some relaxing music" could be biased towards terms such as "relaxing," "quiet", "bedtime", etc., based on the tone of the user's voice.

The ASR system 301 may train one or more machine learning models that receive the one or more hotword attributes 210 as input, and generate, as output, one or more instructions for instructing the endpointer 310 to adjust the endpointing timeout and/or instructing the ASR model 320 to adjust model parameters (or selecting the appropriate ASR model 320). The one or more machine learning models may be updated based on user feedback indicating satisfaction/dissatisfaction with speech recognition. results 322 output by the ASR system 301. Additionally or alternatively, the ASR system 301 may apply static rules that map hotword attributes 210 to instructions for configuring the ASR system 301 as discussed above.

In some additional implementations, neural network-based models for one or more of the endpointer 310, the ASR model 320, and the NLU 330 are conditioned directly on the first acoustic segment 121 characterizing the hotword and/or the hotword embedding 204 in lieu of the explicit hotword attributes 210 extracted by the attribute extractor 200. In these implementations, the models may receive the hotword embedding 204 (and/or the first acoustic segment 121) as a side input along with the second acoustic segment 122 characterizing the query/command portion of the utterance that the ASR system 301 is performing endpointing and speech recognition on.

After or in parallel with the hotword detector 110 detecting the hotword event, the user device 102 may further perform speaker recognition on the acoustic features 120 to identify the user 10. For instance, text-dependent speaker recognition may be performed on the first acoustic segment 121 characterizing the hotword by extracting a speaker embedding therefrom and comparing it with a reference embedding derived from an enrollment utterance of the user 10 speaking the hotword. Text-independent speaker recognition may also be performed on the entire acoustic features 120 to identify the speaker of the utterance 119. Once the user 10 is identified, the ASR system 301 may be personalized or fine-tuned for the user 10 by learning the most optimal set of speech recognition parameters derived from user feedback and consideration of the relationship between the one or more hotword attributes extracted from the hotword portion of the utterance 119 and the subsequent query/command portion of the utterance 119.

While examples herein discuss extracting hotword attributes 202 from the first acoustic segment 121 characterizing a hotword detected by the hotword detector 110, similar attributes may 202 be extracted from an initial portion of an utterance that does not include the hotword. That is, a first acoustic segment 121 may be extracted as pre-fix acoustic features conveying a first portion of an utterance captured streaming audio. This technique could be used in a speech-enabled environment that does not require a hotword to be spoken first, or could be used in a conversational assistant scenario when a microphone is left open to accept additional spoken input from the user after responding to a query so that the user 10 does not have to repeatedly speak the hotword.

Figure 3:
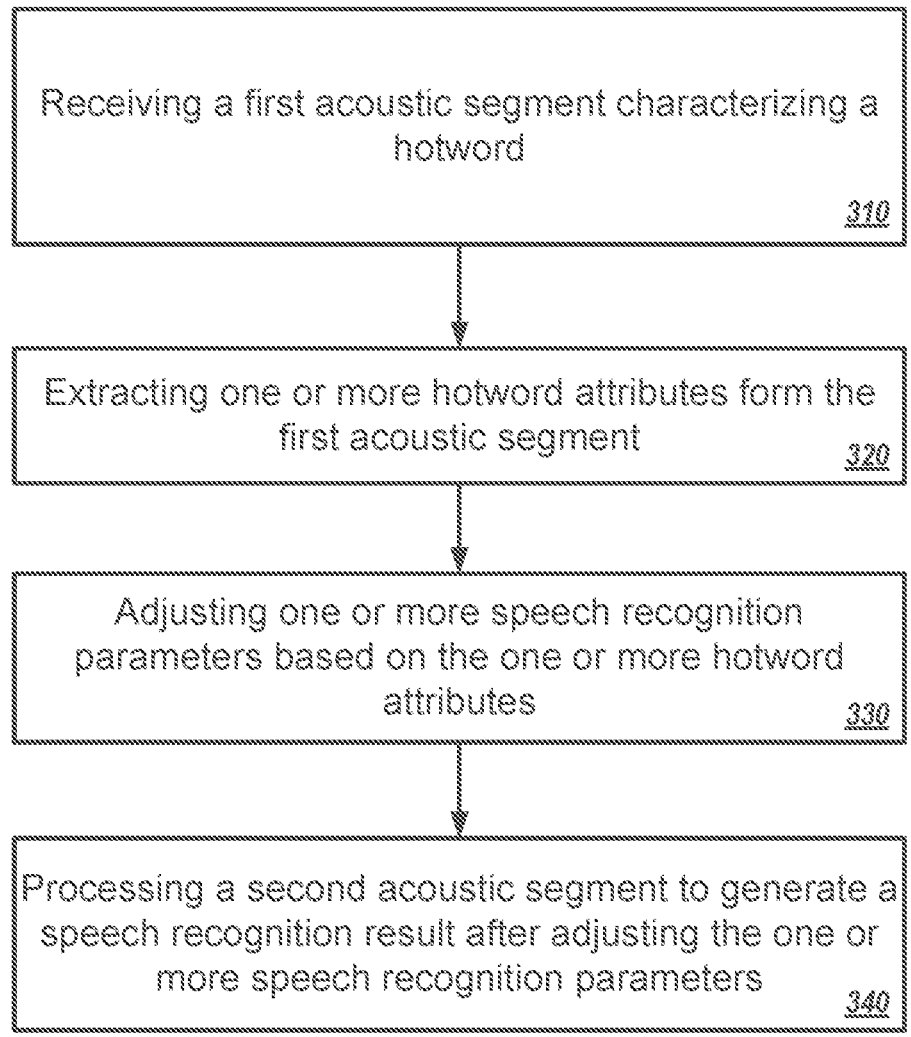
FIG. 3 is a flowchart of an example arrangement of operations for a method of optimizing speech recognition.

FIG. 3 provides a flowchart of an example method 300 for optimizing speech recognition. The method 300 may execute on data processing hardware 103 of a user device 102 or on data processing hardware 113 of a remote system (e.g., cloud-based server) 111. At operation 302, the method 300 includes receiving a first acoustic segment 121 characterizing a hotword detected by a hotword detector 110 in streaming audio 118 captured by the user device 102. At operation 304, the method 300 includes extracting one or more hotword attributes 210 from the first acoustic segment 121. At operation 306, the method includes adjusting, based on the one or more hotword attributes 210 extracted from the first acoustic segment 121, one or more speech recognition parameters of an automated speech recognition (ASR) model 320. At operation 308, after adjusting the speech recognition parameters of the ASR model 320, the method 300 also includes processing, using the ASR model 320, a second acoustic segment 122 to generate a speech recognition result 322. The second acoustic segment 122 characterizes a spoken query/command that follows the first acoustic segment 121 in the streaming audio 118 captured by the user device 102.

A software application (i.e., a software resource) may refer to computer software that causes a computing device to perform a task. In some examples, a software application may be referred to as an "application," an "app," or a "program." Example applications include, but are not limited to, system diagnostic applications, system management application, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
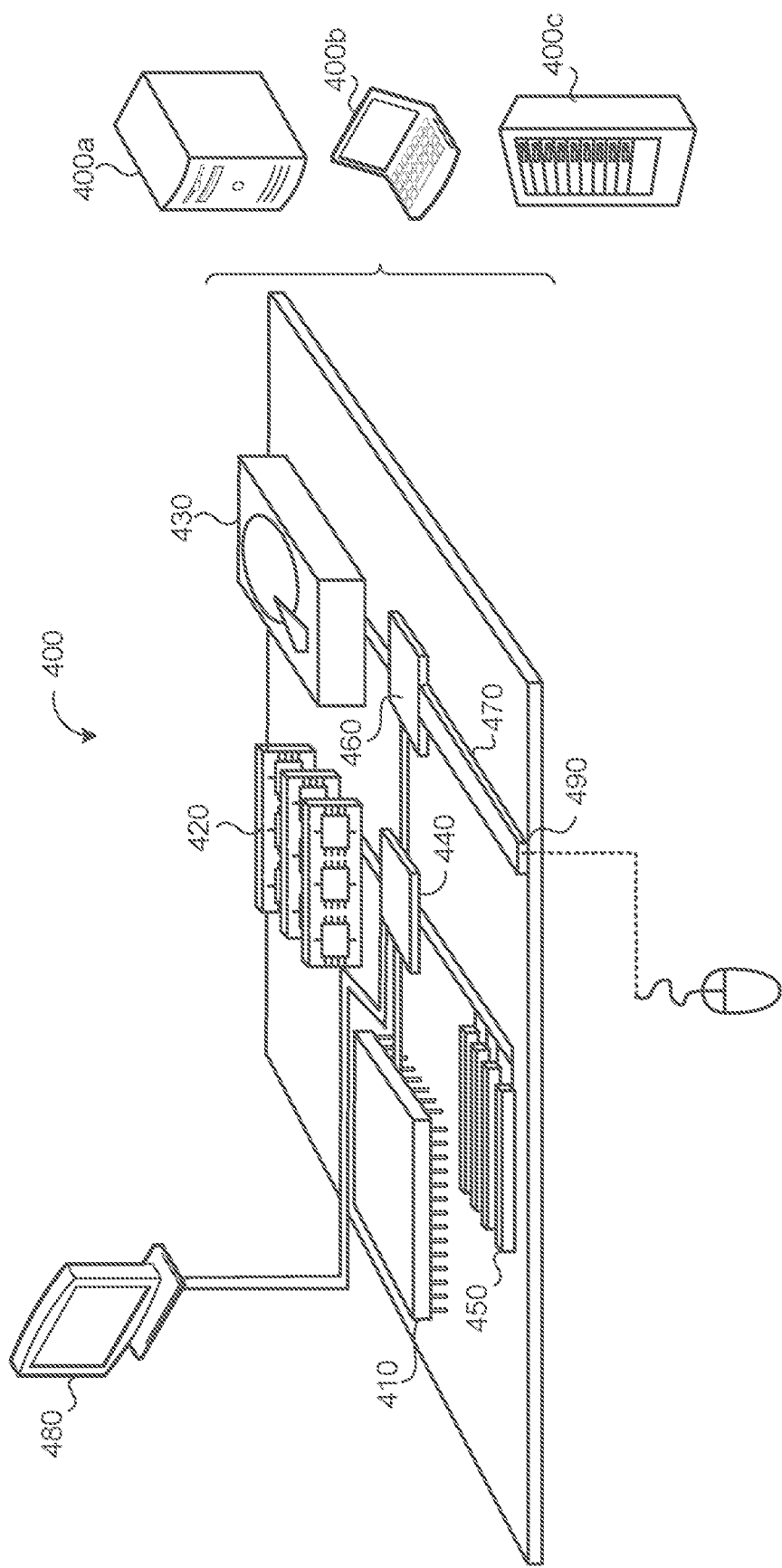
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a first acoustic segment characterizing a hotword detected by a hotword detector in streaming audio captured by a user device;
   without performing speech recognition processing on the streaming audio:
   extracting, by the data processing hardware, one or more hotword attributes from the first acoustic segment, wherein one of the one or more hotword attributes extracted from the first acoustic segment comprises:
   a pause duration measure indicating an extent that a speaker paused while speaking the hotword and/or between speaking the hotword and a second acoustic segment that characterizes a spoken query/command that follows the first acoustic segment in the streaming audio captured by the user device;
   a rate of speech score indicating a rate at which the speaker spoke the first acoustic segment characterizing the hotword; and
   an automated speech recognition (ASR) prediction measure;
   instructing, by the data processing hardware, an endpointer to one of increase or decrease an audio capture duration for the second acoustic segment from a default value based on the pause duration measure; and
   adjusting, by the data processing hardware, based on the one or more hotword attributes extracted from the first acoustic segment, one or more speech recognition parameters of an ASR model; and
   after adjusting the speech recognition parameters of the ASR model and instructing the endpointer to one of increase or decrease the audio capture duration for the second acoustic segment, processing, by the data processing hardware, using the ASR model, the second acoustic segment to generate a speech recognition result.

2. The method of claim 1, wherein the one or more hotword attributes extracted from the first acoustic segment further comprise at least one of:
   a pitch measure; or
   a loudness/tone measure.

3. The method of claim 1, further comprising, when receiving the first acoustic segment:
   receiving, at the data processing hardware, a confidence score indicating a confidence on the likelihood that the streaming audio captured by user device contains a hotword the hotword detector is trained to detect,
   wherein extracting one or more hotword attributes from the first acoustic segment comprises extracting an ASR prediction measure indicating a likelihood that the ASR model will accurately recognize the spoken query/command portion in the second acoustic segment.

4. The method of claim 3, wherein adjusting the one or more speech recognition parameters of the ASR model comprises:
   when the confidence score is greater than a confidence score threshold, decreasing a number of speech recognition hypotheses output by the ASR model and/or decreasing a beam search width of the ASR model; or
   when the confidence score is less than the confidence score threshold, increasing the number of speech recognition hypotheses output by the ASR model and/or increasing the beam search width of the ASR model.

5. The method of claim 3, wherein adjusting the one or more speech recognition parameters of the ASR model comprises:
- when the confidence score is greater than a confidence score threshold, adjusting the one or more speech recognition parameters to bias recognition hypotheses toward recognizing the hotword in the first acoustic segment; or
- when the confidence score is less than the confidence score threshold, adjusting the one or more speech recognition parameters to not bias recognition hypotheses toward recognizing the hotword in the first acoustic segment.

6. The method of claim 1, wherein:
- extracting one or more hotword attributes from the first acoustic segment comprises extracting a pitch measure specifying a range of frequencies associated with the first acoustic segment; and
- adjusting the one or more speech recognition parameters comprises adjusting the one or more speech recognition parameters to apply frequency-based filtering on the second acoustic segment by focusing on the specified range of frequencies when processing the second acoustic segment to generate the speech recognition result.

7. The method of claim 1, further comprising, when one of the one or more hotword attributes extracted from the first acoustic segment comprises a tone and loudness score specifying a tone and loudness of a voice when speaking the hotword, influencing, by the data processing hardware, a natural language understanding (NLU) module or biasing of the ASR model when performing query interpretation on the generated speech recognition result.

8. The method of claim 1, further comprising, instructing, by the data processing hardware, the endpointer to one of additionally increase or additionally decrease the audio capture duration for the second acoustic segment from the default value based on the rate of speech score.

9. The method of claim 1, wherein the one or more hotword attributes are extracted from the first acoustic segment using at least one of a neural network-based model or a heuristic-based model.

10. A system comprising:
- data processing hardware; and
- memory hardware in communication with the data processing hardware, the memory hardware storing instructions that when executed on the data processing hardware cause the data processing hardware to perform operations comprising:
  - receiving a first acoustic segment characterizing a hotword detected by a hotword detector in streaming audio captured by a user device;
  - without performing speech recognition processing on the streaming audio:
  - extracting one or more hotword attributes from the first acoustic segment, wherein one of the one or more hotword attributes extracted from the first acoustic segment comprises:
    - a pause duration measure indicating an extent that a speaker paused while speaking the hotword and/or between speaking the hotword and a second acoustic segment that characterizes a spoken query/command that follows the first acoustic segment in the streaming audio captured by the user device;
    - a rate of speech score indicating a rate at which the speaker spoke the first acoustic segment characterizing the hotword; and
    - an automated speech recognition (ASR) prediction measure;
  - instructing an endpointer to one of increase or decrease an audio capture duration for the second acoustic segment from a default value based on the pause duration measure; and
  - adjusting, based on the one or more hotword attributes extracted from the first acoustic segment, one or more speech recognition parameters of an ASR model; and
  - after adjusting the speech recognition parameters of the ASR model and instructing the endpointer to one of increase or decrease the audio capture duration for the second acoustic segment, processing, using the ASR model, the second acoustic segment to generate a speech recognition result.

11. The system of claim 10, wherein the one or more hotword attributes extracted from the first acoustic segment further comprise at least one of:
- a pitch measure; or
- a loudness/tone measure.

12. The system of claim 10, wherein the operations further comprise, when receiving the first acoustic segment:
- receiving a confidence score indicating a confidence on the likelihood that the streaming audio captured by user device contains a hotword the hotword detector is trained to detect,
- wherein extracting one or more hotword attributes from the first acoustic segment comprises extracting an ASR prediction measure indicating a likelihood that the ASR model will accurately recognize the spoken query/command portion in the second acoustic segment.

13. The system of claim 12, wherein adjusting the one or more speech recognition parameters of the ASR model comprises:
- when the confidence score is greater than a confidence score threshold, decreasing a number of speech recognition hypotheses output by the ASR model and/or decreasing a beam search width of the ASR model; or
- when the confidence score is less than the confidence score threshold, increasing the number of speech recognition hypotheses output by the ASR model and/or increasing the beam search width of the ASR model.

14. The system of claim 12, wherein adjusting the one or more speech recognition parameters of the ASR model comprises:
- when the confidence score is greater than a confidence score threshold, adjusting the one or more speech recognition parameters to bias recognition hypotheses toward recognizing the hotword in the first acoustic segment; or
- when the confidence score is less than the confidence score threshold, adjusting the one or more speech recognition parameters to not bias recognition hypotheses toward recognizing the hotword in the first acoustic segment.

15. The system of claim 10, wherein:
- extracting one or more hotword attributes from the first acoustic segment comprises extracting a pitch measure specifying a range of frequencies associated with the first acoustic segment; and
- adjusting the one or more speech recognition parameters comprises adjusting the one or more speech recognition parameters to apply frequency-based filtering on the second acoustic segment by focusing on the specified range of frequencies when processing the second acoustic segment to generate the speech recognition result.

16. The system of claim 10, wherein the operations further comprise, when one of the one or more hotword attributes extracted from the first acoustic segment comprises a tone and loudness score specifying a tone and loudness of a voice when speaking the hotword, influencing a natural language understanding (NLU) module or biasing of the ASR model when performing query interpretation on the generated speech recognition result.

17. The system of claim 10, wherein the operations further comprise, instructing the endpointer to one of additionally increase or additionally decrease the audio capture duration for the second acoustic segment from the default value based on the rate of speech score.

18. The system of claim 10, wherein the one or more hotword attributes are extracted from the first acoustic segment using at least one of a neural network-based model or a heuristic- based model.

\* \* \* \* \*